(12) United States Patent
Kwon et al.

(10) Patent No.: US 9,472,824 B2
(45) Date of Patent: Oct. 18, 2016

(54) FUEL CELL STACK

(71) Applicant: Hyundai Motor Company, Seoul (KR)

(72) Inventors: Hyuck Roul Kwon, Gyeonggi-do (KR);
Hyun Yoo Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 166 days.

(21) Appl. No.: 13/861,762

(22) Filed: Apr. 12, 2013

(65) Prior Publication Data
US 2014/0186740 A1     Jul. 3, 2014

(30) Foreign Application Priority Data
Dec. 28, 2012   (KR) .................. 10-2012-0155797

(51) Int. Cl.
*H01M 8/0202* (2016.01)
*H01M 8/2485* (2016.01)
*H01M 8/24* (2016.01)
*H01M 8/02* (2016.01)

(52) U.S. Cl.
CPC ......... *H01M 8/2485* (2013.01); *H01M 8/0258* (2013.01); *H01M 8/0267* (2013.01); *H01M 8/0276* (2013.01); *H01M 8/2405* (2013.01); *H01M 8/2465* (2013.01); *H01M 2250/20* (2013.01); *Y02E 60/50* (2013.01); *Y02P 70/56* (2015.11); *Y02T 90/32* (2013.01)

(58) Field of Classification Search
CPC ......... H01M 8/00; H01M 8/02; H01M 8/14; H01M 8/006; H01M 8/0269; H01M 8/0202; H01M 8/145; H01M 8/2465; H01M 2250/00; H01M 2008/00; H01M 2/2485; H01M 2/0267; H01M 2/0258; H01M 2/0276; H01M 2/2405; H01M 2/2465; Y02E 60/50

USPC ....... 429/507–510, 457, 458, 483, 513, 514, 429/463, 18, 34, 35, 36, 38, 400, 247–255, 429/129–147

See application file for complete search history.

(56) References Cited

U.S. PATENT DOCUMENTS 5,863,671 A * 1/1999 Spear, Jr. et al. ..... F28D 9/0075
                                                                429/413
7,820,335 B2 10/2010 Budinski et al.
(Continued)

FOREIGN PATENT DOCUMENTS

JP         2002-050392    *  2/2002  ............. H01M 8/24
JP         2009123447 A     6/2009
(Continued)

OTHER PUBLICATIONS

English Translation of KR1020040055847.*
(Continued)

*Primary Examiner* — Patrick Ryan
*Assistant Examiner* — Kiran Akhtar
(74) *Attorney, Agent, or Firm* — Mintz Levin Cohn Ferris Glovsky and Popeo, P.C.; Peter F. Corless

(57) ABSTRACT

Disclosed is a fuel cell stack using a separator in which two or more reaction areas are connected in an insulated manner. Further, a gas diffusion layer, a membrane electrode assembly and the like are sequentially stacked on each reaction area of the separator, and the reaction areas are connected in series to configure a single stack module thereby increasing the voltage generated in the fuel cell stack and maintain the current at a low level.

8 Claims, 5 Drawing Sheets

(56) References Cited

U.S. PATENT DOCUMENTS

| | | |
|---|---|---|
| 2003/0224237 A1 | 12/2003 | Vanderleeden et al. |
| 2006/0014071 A1 | 1/2006 | Blank et al. |
| 2006/0286426 A1* | 12/2006 | Kikuchi et al. ...... H01M 8/0234 429/429 |

FOREIGN PATENT DOCUMENTS

| | | | |
|---|---|---|---|
| JP | 2009181713 A | | 8/2009 |
| KR | 10-2004-0103265 | | 12/2004 |
| KR | 1020040055847 | * | 1/2006 ............. H01M 8/02 |
| KR | 10-2010-0054216 | | 5/2010 |
| KR | 10-2011-0044051 | | 4/2011 |

OTHER PUBLICATIONS

English Translation of JP2002-050392.*
English Translation of KR1020040055847 (Jan. 2006).*
English Translation of JP2002-050392 (Feb. 2002).*

* cited by examiner

Cross section of C-C

FUEL CELL STACK

CROSS-REFERENCE TO RELATED APPLICATION

This application claims under 35 U.S.C. §119(a) the benefit of Korean Patent Application No. 10-2012-0155797 filed Dec. 28, 2012, the entire contents of which are incorporated herein by reference.

BACKGROUND (a) Technical Field

The present invention relates to a fuel cell stack. More particularly, the present invention relates to a fuel cell stack which employs a separator, in which two or more reaction areas are connected in an insulated manner to maintain the output voltage at a high level and the output current at a low level under the same output of the fuel cell stack, and improve the productivity of the fuel cell stack, thus reducing the manufacturing cost.

(b) Background Art

The configuration of a unit cell of a fuel cell stack will be described with reference to FIGS. 6 and 7. A membrane electrolyte assembly (MEA) is positioned in the center of the unit cell. The membrane electrolyte assembly includes a polymer electrolyte membrane 11 capable of transporting hydrogen ions (protons) and catalyst layers such as a cathode 12 and an anode 13, which are coated on both sides of the electrolyte membrane 11 such that hydrogen and oxygen react with each other.

Moreover, a gas diffusion layer (GDL) 16 and a gasket 18 are sequentially stacked on the outside of each of the cathode 12 and the anode 13, a separator 20 in which flow fields are formed to supply and discharge a fuel (hydrogen) and an oxidant (air) and discharge water produced by a reaction is stacked on the outside of the gas diffusion layer 16, and an end plate 30 for supporting and fixing the above-described components is connected to the outermost end.

Accordingly, at the anode 13 of the fuel cell stack, an oxidation reaction of hydrogen occurs to produce hydrogen ions (protons) and electrons, and the produced hydrogen ions and electrons are transmitted to the cathode 12 through the electrolyte membrane 10 and the separator 20. At the cathode 12, the hydrogen ions and electrons transmitted from the anode 13 react with the oxygen-containing air to produce water. At the same time, electrical energy is generated by the flow of electrons and supplied to a load requiring the electrical energy through a current collector connected to the end plate 30.

Meanwhile, as shown in FIGS. 6 and 7, the separator 20 includes a reaction area 23 consisting of flat lands 21 that are in direct contact with the gas diffusion layer 16 and channels 22 each located between the lands 21 and serving as a passage of the fuel such as hydrogen and air (oxygen) and a manifold configured in the form of a through aperture for supply and discharge of hydrogen, air, coolant, etc. and provided on both ends of the reaction area 23.

Here, the manifold consists of an air supply manifold 24, a coolant supply manifold 25, and a hydrogen supply manifold 26, which are formed in parallel on one end of the reaction area 23, and an air discharge manifold 27, a coolant discharge manifold 28, and a hydrogen discharge manifold 29, which are formed in parallel on the other end of the reaction area 2.

For reference, in a fuel cell stack shown in FIG. 6 in which the number of separators having a reaction area of 2A is n, and in a fuel cell stack shown in FIG. 7 in which the number of separators having a reaction area of A is 2n, the entire reaction areas of the two fuel cell stacks are the same, which represents that the outputs of the fuel cell stacks are the same, but the output voltages and currents of the fuel cell stacks are different. As such the Equation 1 below is applied:

Fuel cell stack output=Reaction area($cm^2$)×Current density(A/$cm^2$)×Cell number×Cell average voltage($V\_cell$). [Equation 1]

The conventional separator 20 shown in the right of FIG. 6 has a large reaction area and is assembled in a fuel cell stack of a single module design. Since the reaction area (proportional to the current) is large and the number of cells (proportional to the voltage) is small, the voltage is relatively low and the current is high.

Due to these features, it is possible to facilitate the assembly of the fuel cell stack, reduce the size of the fuel cell stack, and the production costs associated therewith. However, since the voltage is relatively low, a high current is typically used, which results in a reduction in efficiency of a drive unit (e.g., a drive motor, an inverter, etc.) and thus causes a cooling problem, and in the case of the same output, the weight and volume of the drive unit increases, which is very problematic.

The conventional separator 20 shown in the right portion of FIG. 7 has a structure in which the reaction area is reduced to half of that shown in FIG. 6 and is assembled in a fuel cell stack of a dual module type in which two single modules are arranged up and down. Accordingly, it is possible to maintain the output voltage of the fuel cell stack at a high level (two times that of the fuel cell stack employing the separator of FIG. 6), maintain the output current at a low level (½ times that of the fuel cell stack employing the separator of FIG. 6), and improve the efficiency of the drive unit (e.g., a drive motor, an inverter, etc.). However, as the number of cells stacked increases, the number of manufacturing processes and parts increases, and thus the manufacturing cost increases.

In order to reduce the manufacturing costs and simplify the manufacturing process, the number of cells of the fuel cell stack including the above-described separator tends to be reduced, and the reaction area of the separator tends to be increased. As such, when the number of cells of the fuel cell stack is reduced and the reaction area of the separator is increased, when the electrical power generated by the fuel cell stack is used by electrically powered components (e.g., a drive motor for driving a fuel cell stack, an inverter, etc.) at the same output, it is advantageous to maintain the voltage generated by the fuel cell stack at a high level and the current at a low level, and thus generally the output of the fuel stack is often boosted to increase the voltage and reduce the current.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a fuel cell stack, which employs a separator with a structure in which two or more reaction areas are connected in an insulated manner by means of an insulating material to increase the voltage generated in the fuel cell stack and maintain the current at a lower level, in which a gas diffusion layer, a membrane electrode assembly, etc. are sequentially stacked on each reaction area to configure stack modules having two or more reaction areas, and the reaction areas are connected in series to configure a single stack module. As a result, it is possible to reduce the number of stacked cells of the fuel cell stack, which results in a reduction in the number of manufacturing processes and manufacturing costs, to improve the productivity of the fuel cell stack, facilitate mounting on a vehicle, and improve the efficiency of drive components (e.g., a drive motor, an inverter, etc.) due to high output voltage of the fuel cell stack.

In one aspect, the present invention provides a fuel cell stack including: a separator having a structure in which manifolds for supplying hydrogen, coolant, and air are formed and two or more reaction areas are connected to each other in an insulated manner. In addition, a gas diffusion layer is stacked on each of the reaction areas of the separator, and a membrane electrode assembly is stacked on the gas diffusion layer.

In an exemplary embodiment, the separator includes two or more divided separators each having a structure in which supply-side manifolds for supplying hydrogen, coolant, and air are formed on one end, discharge-side common manifolds for discharging hydrogen, coolant, and air are formed on an other (opposite) end, and a reaction area is formed between the supply-side manifolds and the discharge-side common manifolds, the two or more divided separators being connected to each other in an insulated manner.

In another exemplary embodiment, the discharge-side manifolds of the divided separators are bonded to each other in an insulated manner so that the two or more reaction areas are arranged adjacent to each other.

In still another exemplary embodiment, the outsides of the discharge-side common manifolds are open before the divided separators are bonded and the discharge-side common manifolds after bonding are formed as a common through aperture through which hydrogen, coolant, and air, which are discharged from the two or more reaction areas, flow together.

In yet another exemplary embodiment, a gasket is integrally injection-molded on edges of the reaction areas of the divided separators and on edges of the respective manifolds and, at the same time, integrally injection-molded on opposing sides of the discharge-side common manifolds of the divided separators in an insulated manner.

In still yet another exemplary embodiment, the gas diffusion layer is stacked on each of the reaction areas of the separator.

In a further exemplary embodiment, the membrane electrode assembly has the same shape as the planar shape of the separator in which two or more divided separators are bonded to each other.

In another further exemplary embodiment, the gas diffusion layer, the membrane electrode assembly, and a current collector are sequentially stacked on the two or more reaction areas of the separator and the reaction areas are connected in series to configure a single stack module.

In still another further preferred embodiment, the separator includes two or more divided separators each having a structure in which supply-side manifolds for supplying hydrogen, coolant, and air are formed on one end, discharge-side manifolds for discharging hydrogen, coolant, and air are formed on the other end, and a reaction area is formed between the supply-side manifolds and the discharge-side manifolds, the two or more divided separators being connected to each other in an insulated manner.

In yet another further preferred embodiment, a gasket is integrally injection-molded on edges of the reaction areas of the divided separators and on edges of the respective manifolds and, at the same time, integrally injection-molded on a boundary between the divided separators arranged up and down in an insulated manner.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
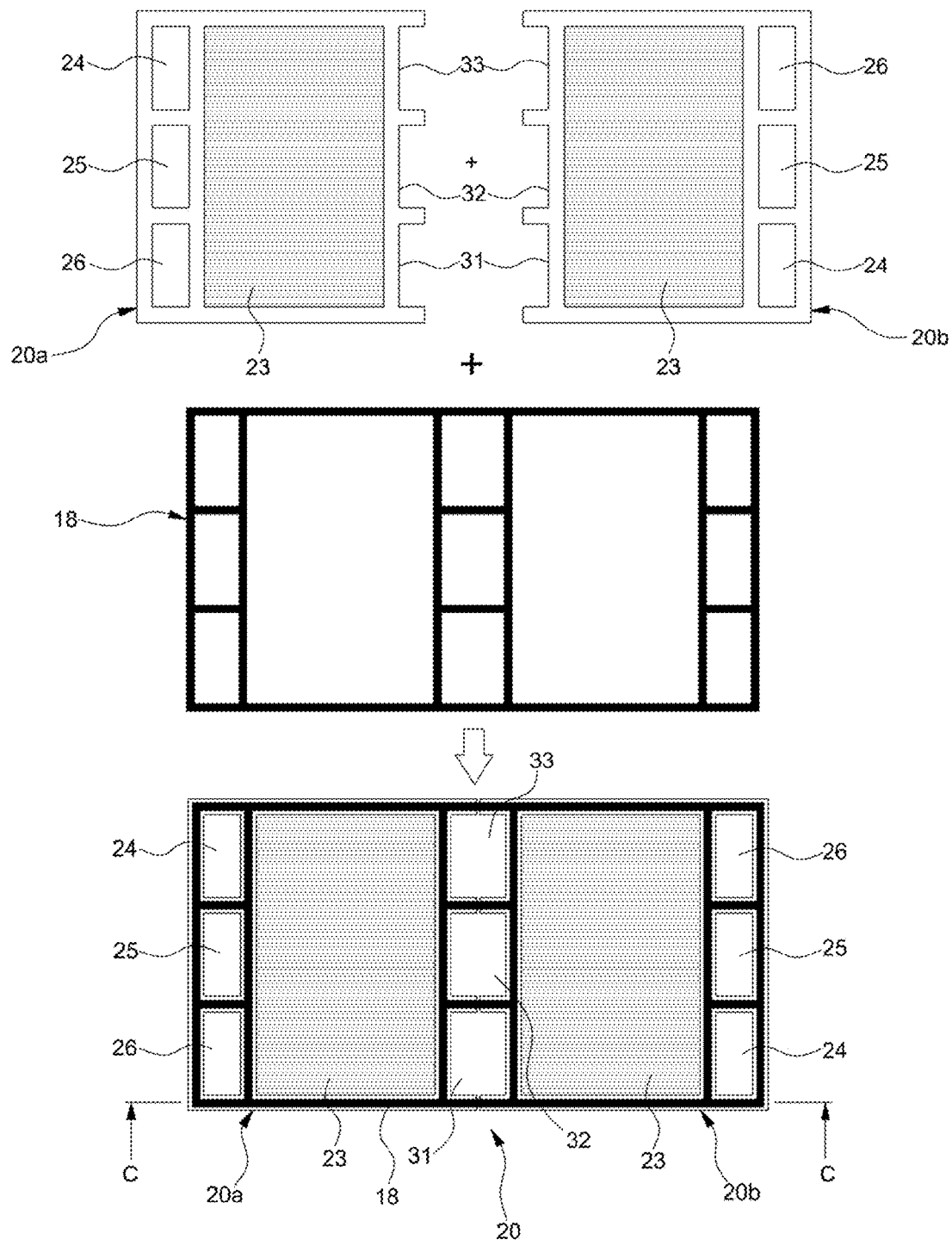
FIG. 1 is a plan view showing the structure of a separator included in a fuel cell stack in accordance with an exemplary embodiment of the present invention.

Reference numerals set forth in the Drawings includes reference to the following elements as further discussed below:

| | |
|---|---|
| 10: membrane electrode assembly | 11: polymer electrolyte membrane |
| 12: cathode | 13: anode |
| 16: gas diffusion layer | 18: gasket |
| 20: separator | 21: land |
| 22: channel | 23: reaction area |
| 24: air supply manifold | 25: coolant supply manifold |
| 26: hydrogen supply manifold | 27: air discharge manifold |
| 28: coolant discharge manifold | 29: hydrogen discharge manifold |
| 30: current collector | |
| 31: air discharge common manifold | |
| 32: coolant discharge common manifold | |
| 33: hydrogen discharge common manifold | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention aims at providing a fuel cell stack including a separator with an improved structure that can provide all of the advantages of a separator included in the above-described conventional single module stack and a separator included in a dual module stack.

To this end, the separator included in the fuel cell stack of the present invention has a structure in which two or more divided separators are arranged in parallel in an insulated manner, and the two divided separators will be referred to as a first divided separator 20a and a second divided separator 20b to facilitate understanding of the present invention.

Referring to FIG. 1, the first and second divided separators 20a and 20b in accordance with an exemplary embodiment of the present invention include a hydrogen supply manifold 26, a coolant supply manifold 25, and an air supply manifold 24, which are formed on one end as supply-side manifolds, and a hydrogen discharge common manifold 33, a coolant discharge common manifold 32, and an air discharge common manifold 31, which are formed on the other end as discharge-side manifolds. Here, before the first and second divided separators 20a and 20b are connected to each other, the outsides of the hydrogen discharge common manifold 33, the coolant discharge common manifold 32, and the air discharge common manifold 31 are in an open state.

In particular, a reaction area 23 including lands being in direct contact with a gas diffusion layer and channels each located between the lands and serving as a passage for fuel such as hydrogen and air (oxygen) is formed between the supply-side manifolds and the discharge-side common manifolds of the first and second divided separators 20a and 20b.

When the first and second divided separators 20a and 20b are connected on the same plane in an insulated manner, the reaction areas 23 of the first and second divided separators 20a and 20b, i.e., two or more reaction areas 23, are arranged in parallel on the same plane. Here, a symbol "+"in FIG. 1 means a bonding or adding components presented therein. For example, as a method to bond the first and second divided separators 20a and 20b in an insulated manner, a gasket 18 may be integrally injection-molded on the first and second divided separators 20a and 20b.

Figure 2:
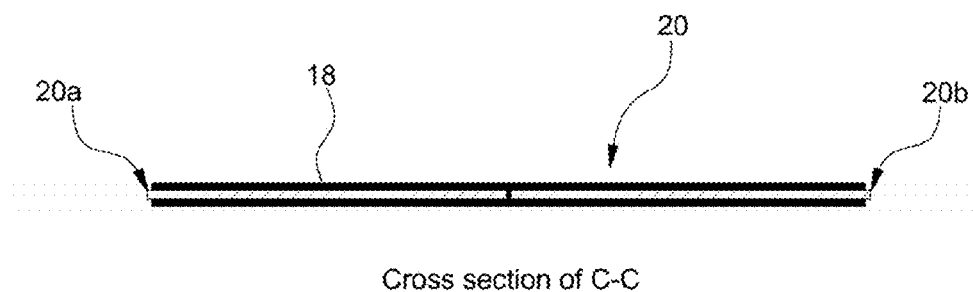
FIG. 2 is a cross-sectional view taken along line C-C of FIG. 1.

In more detail, the gasket 18 is integrally injection-molded along edge areas of the first and second divided separators 20a and 20b, i.e., along edges of the reaction areas 23 and edges of the supply-side manifolds and the discharge-side common manifolds and, as shown in FIG. 2. The gasket 18 is integrally injection-molded on opposing sides of the discharge-side common manifolds such that the first and second divided separators 20a and 20b are bonded to each other in an insulated manner by means of the gasket 18.

Meanwhile, while the outsides of the discharge-side manifolds including the hydrogen discharge common manifold 33, the coolant discharge common manifold 32, and the air discharge common manifold 31 are in an open state before the first and second divided separators 20a and 20b are connected to each other, when the first and second divided separators 20a and 20b are bonded to each other in an insulated manner by means of the gasket 18 in the above-described manner, the hydrogen discharge common manifold 33, the coolant discharge common manifold 32, and the air discharge common manifold 31 are formed as a single common through aperture.

In other words, after the first and second divided separators 20a and 20b are bonded to each other, the hydrogen discharge common manifold 33, the coolant discharge common manifold 32, and the air discharge common manifold 31 are formed as a common through aperture through which hydrogen, coolant, and air, which are discharged from the reaction area 23 of the first divided separator 20a and the reaction area 23 of the second divided separator 20b, flow together.

Figure 3:
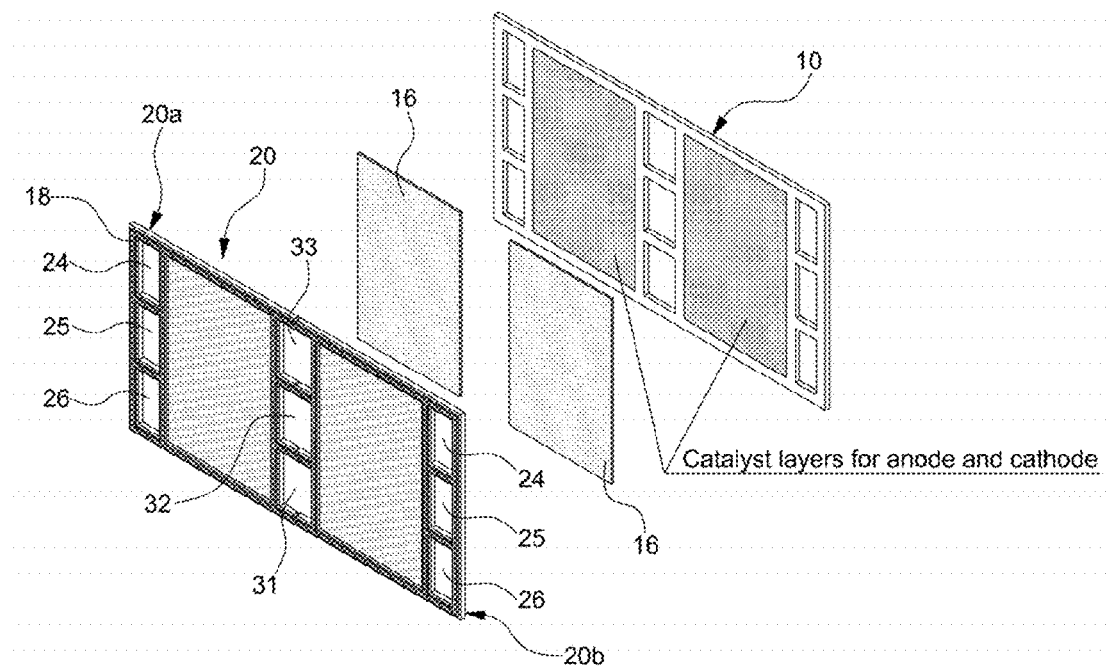
FIG. 3 is an exploded perspective view showing a stacked structure of a fuel cell stack in accordance with an exemplary embodiment of the present invention.
Figure 4:
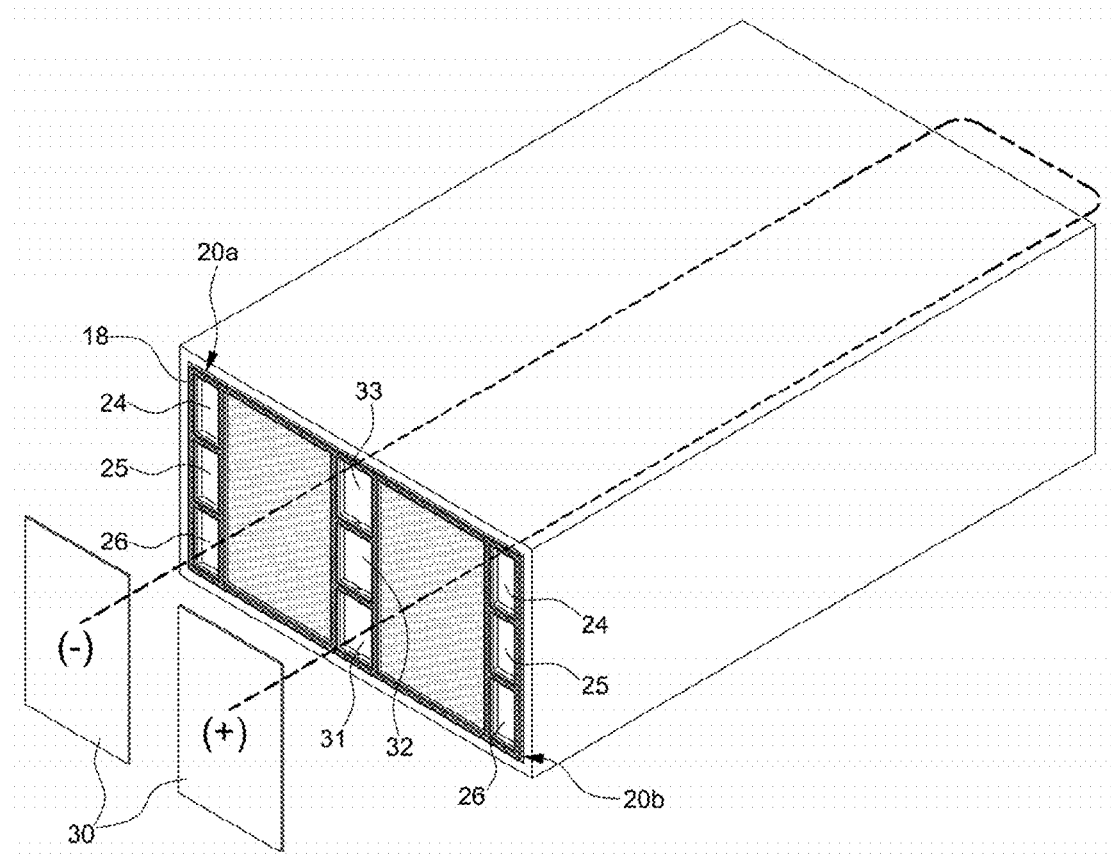
FIG. 4 is a schematic diagram showing an assembled state of a fuel cell stack in accordance with an exemplary embodiment of the present invention.

Next, an exemplary embodiment for configuring a fuel cell stack by stacking a gas diffusion layer, a membrane electrode assembly, etc., on the separator of the present invention configured in the above-described manner will be descried with reference to FIGS. 3 and 4.

A gas diffusion layer 16 is stacked over the separator 20 of the present invention, i.e., over the respective reaction areas 23 of the first and second divided separators 20a and 20b. Here, a total of two gas diffusion layers 16 are used to cover the respective reaction areas 23 of the first and second divided separators 20a and 20b. Moreover, a membrane electrode assembly 10 is stacked on the separator 20 with the gas diffusion layer 16 interposed therebetween, and the membrane electrode assembly 10 of the present invention has the same shape as the planar shape of the bonded first and second divided separators 20a and 20b.

In more detail, the membrane electrode assembly 10 has a structure in which catalyst layers (i.e., a cathode and an anode) are formed in positions facing the gas diffusion layers 16 stacked on the respective reaction areas 23 of the first and second divided separators 20a and 20b, through holes having the same size are formed on both sides to provide passages of the supply-side manifolds, and through apertures having the same size are formed in the middle to provide passages of the discharge-side common manifolds.

Accordingly, when the gas diffusion layers 16 are stacked on the respective reaction areas 23 of the first and second divided separators 20a and 20b, the membrane electrode assembly 10 is stacked on the first and second divided separators 20a and 20b with the gas diffusion layers 16 interposed therebetween.

Of course, the first and second divided separators 20a and 20b, the gas diffusion layers 16, the electrode membrane assembly 10, etc. are repeatedly stacked to form a plurality of cells, and then a current collector 30 for collecting electricity generated by the fuel cell stack is stacked on both outermost ends.

As such, when the gas diffusion layer 16, the membrane electrode assembly 10, the current collectors 10, etc. are sequentially stacked on the first divided separator 20a, a single stack module is formed and, when the gas diffusion layer 16, the membrane electrode assembly 10, the current collectors 30, etc. are sequentially stacked on the second divided separator 20b, another single stack module is formed and, thus completing a fuel cell stack having two stack modules. Here, the two stack modules configured in the above-described manner are connected together in series to form a single stack module.

In more detail, a single stack module is formed by repeatedly stacking the first divided separator 20a, the gas diffusion layer 16, the membrane electrode assembly 10, the gas diffusion layer 16, and the first divided separator 20a and then stacking the current collectors 30 on both sides thereof, and another stack module is formed by repeatedly stacking the second divided separator 20b, the gas diffusion layer 16, the membrane electrode assembly 10, the gas diffusion layer 16, and the second divided separator 20b and then to stacking the current collectors 30 on both sides thereof. Then, when the current collectors 30 on the one stack module and the other stack module are conductively connected, the two stack modules are connected in series, thus forming a single stack module. An end plate for providing a fastening surface pressure for the fuel cell stack is also stacked on the outside of each of the current collectors 30.

As such, it is possible to form two or more stack modules in a single package space using the separator 20 in accordance with an exemplary embodiment of the present invention, in which the first and second divided separators 20a and 20b are bonded to each other, and to form a single stack module by connecting the two or more stack modules in series, thus providing a fuel cell stack which can increase the voltage generated in the fuel cell stack and maintain the current at a low level.

Next, a separator in accordance with another exemplary embodiment of the present invention will be described with reference to FIG. 5. The separator in accordance with another exemplary embodiment of the present invention is characterized in that first and second divided separators 20a and 20b are arranged up and down in parallel and connected to each other in an insulated manner.

To this end, the first and second divided separators 20a and 20b have the same structure in which supply-side manifolds including a hydrogen supply manifold 26, a coolant supply manifold 25, and an air supply manifold 24 are formed on one end thereof, and discharge-side manifolds including a hydrogen discharge manifold 29, a coolant discharge manifold 28, and an air discharge manifold 27 are formed on the other end thereof.

A reaction area 23 including lands being in direct contact with a gas diffusion layer and channels each located between the lands and serving as a passage of fuel such as hydrogen and air (oxygen) is formed between the supply-side manifolds and the discharge-side manifolds of the first and second divided separators 20a and 20b. The first and second divided separators 20a and 20b configured in the above-described manner are arranged up and down and bonded to each other in an insulated manner by means of a gasket 18, thus forming the separator 20 in accordance with another exemplary embodiment of the present invention.

Figure 5:
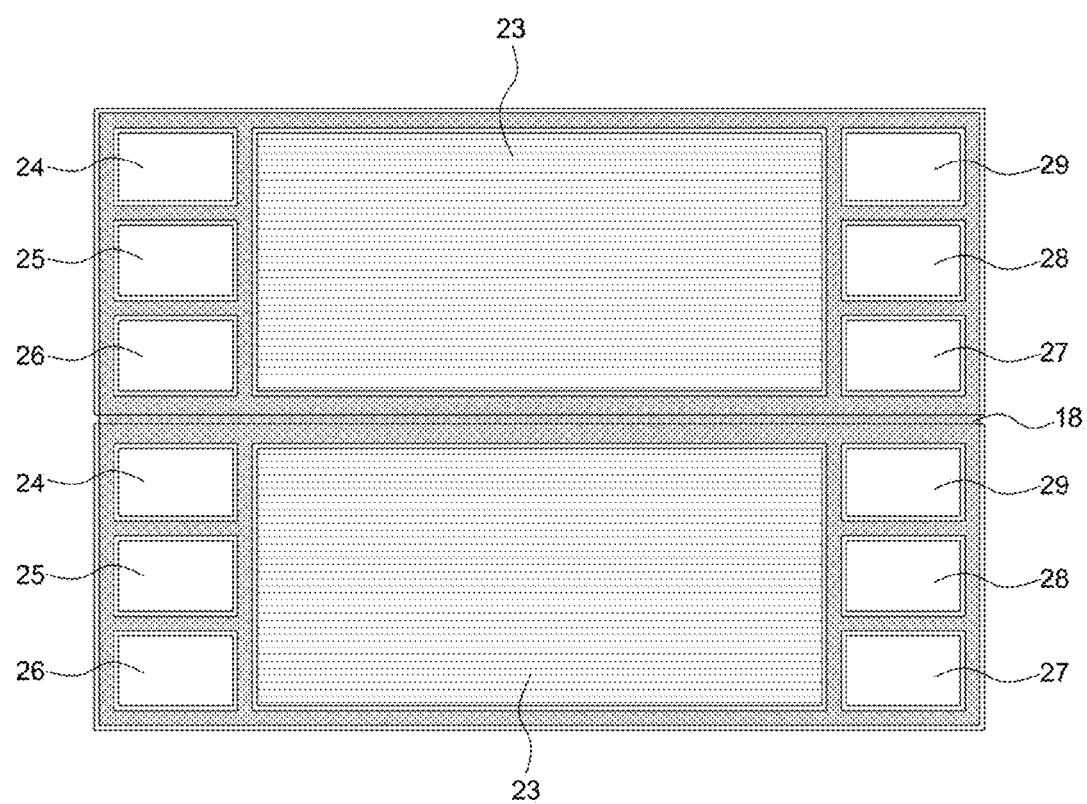
FIG. 5 is a plan view showing the structure of a separator included in a fuel cell stack in accordance with another exemplary embodiment of the present invention.
Figure 6:
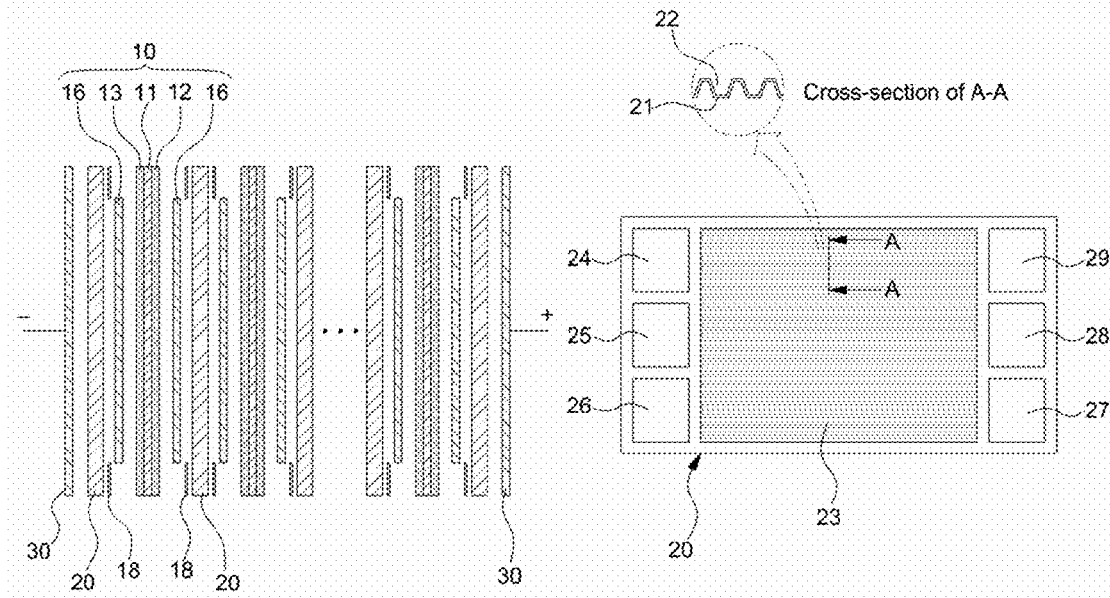
FIGS. 6 and 7 are schematic diagrams showing examples of conventional separators and fuel cell stacks including the same.
Figure 7:
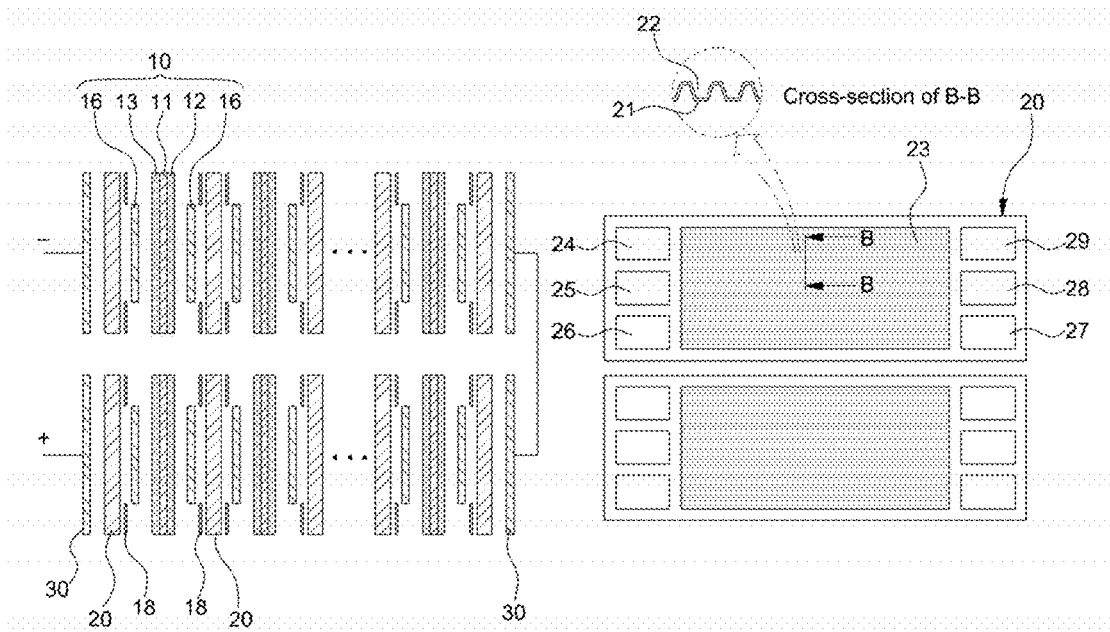

In more detail, the gasket 18 is integrally injection-molded along edge areas of the first and second divided separators 20a and 20b, i.e., along edges of the reaction areas 23 and edges of the supply-side manifolds and the discharge-side manifolds and, as shown in FIG. 5, the gasket 18 is integrally injection-molded on a boundary between the first and second divided separators 20a and 20b arranged up and down, thus forming the separator 20 in accordance with another exemplary embodiment of the present invention.

As such, while the separator in accordance with another exemplary embodiment of the present invention is larger in size than the separator in accordance with the above-described exemplary embodiment of the present invention, the divided separators are connected in an insulated manner by means of the gasket to form a structure in which two or more reaction areas are arranged in parallel adjacent to each other, and thus it is possible to reduce the number of stacked cells in the fuel cell stack, improve the assemblability of the fuel cell stack, and reduce the number of manufacturing processes and the manufacturing cost.

As described above, the present invention provides the following effects.

The separator having a structure in which the divided separators are connected in an insulated manner by means of the gasket such that two or more reaction areas are arranged in parallel adjacent to each other is provided, and the gas diffusion layer, the membrane electrode assembly, the current collector, etc. are stacked on each of the reaction areas, thus forming the stack modules having the two or more reaction areas. Thus, it is possible to provide a fuel cell stack which increases the voltage generated in the fuel cell stack and maintains the current at a low level.

Moreover, since the fuel cell stack of the present invention has a structure in which two or more stack modules are connected in series in a single stack module, it is possible to reduce the number of stacked cells of the fuel cell stack, improve the assemblability of the fuel cell stack, reduce the number of manufacturing processes and the manufacturing costs, and facilitate the mounting of the fuel cell stack on a vehicle.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell stack comprising:
  a separator having two or more divided separators each having a structure in which manifolds that supply hydrogen, coolant and air are formed and each divided separator comprising a reaction area;
  a gas diffusion layer stacked on each of the reaction areas of the two or more divided separators, each of the reaction area consisting of flat lands that are in direct contact with the gas diffusion layer and channels each located between the lands and serving as a passage of the fuel such as hydrogen and air; and
  a membrane electrode assembly stacked on the gas diffusion layer,
  wherein a gasket is formed along edges of the reaction areas of the two or more divided separators and along edges of the respective manifolds, and the gasket is formed on a boundary between the two or more divided separators formed on the same plane of the separator such that the two or more divided separators are connected on the same plane of the separator in an insulated manner and the reaction areas formed on the two or more divided separators are connected to each other in an insulated manner.

2. The fuel cell stack of claim 1, wherein the separator comprises two or more divided separators each having a structure in which supply-side manifolds that supply hydrogen, coolant, and air are formed on one end, discharge-side common manifolds discharge hydrogen, coolant, and air are formed on the other end, and each of the reaction area is formed between the supply-side manifolds and the discharge-side common manifolds, the two or more divided separators being connected to each other in an insulated manner.

3. The fuel cell stack of claim 2, wherein the discharge-side manifolds of the divided separators are bonded to each other in an insulated manner so that the reaction areas formed on the two or more divided separators are arranged adjacent to each other.

4. The fuel cell stack of claim 2, wherein the outsides of the discharge-side common manifolds are open before the divided separators are bonded and the discharge-side common manifolds after bonding are formed as a common through aperture through which hydrogen, coolant, and air, which are discharged from the two or more reaction areas, flow together.

5. The fuel cell stack of claim 1, wherein the gasket is integrally injection-molded on edges of the reaction areas of the two or more divided separators and on edges of the respective manifolds and, at the same time, integrally injection-molded on opposing sides of the discharge-side common manifolds of the divided separators in an insulated manner.

6. The fuel cell stack of claim 1, wherein the membrane electrode assembly has the same shape as the planar shape of the separator in which two or more divided separators are bonded to each other.

7. The fuel cell stack of claim 1, wherein the gas diffusion layer, the membrane electrode assembly, and a current collector are sequentially stacked on the reaction areas of the two or more divided separators and the reaction areas are connected in series to configure a single stack module.

8. The fuel cell stack of claim 1, wherein the gasket is integrally injection-molded on edges of the reaction areas of the two or more divided separators and on edges of the respective manifolds and, at the same time, integrally injection-molded on a boundary between the divided separators vertically connected to each other in an insulated manner.

* * * * *